(12) United States Patent
Ohkohdo et al.

(10) Patent No.: US 6,530,683 B1
(45) Date of Patent: Mar. 11, 2003

(54) VEHICLE LIGHTING DEVICE USING LED LIGHT SOURCE

(75) Inventors: Masaya Ohkohdo, Isehara (JP); Katuhiro Murahashi, Isehara (JP); Kouji Tsunoda, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/619,393

(22) Filed: Jul. 19, 2000

(30) Foreign Application Priority Data

Aug. 23, 1999 (JP) .......................................... 11-236099

(51) Int. Cl.$^7$ ................................................ F21V 8/00
(52) U.S. Cl. .................... 362/511; 362/500; 362/545
(58) Field of Search ................................ 362/500, 555, 362/511, 540, 541, 543, 544, 545

(56) References Cited

U.S. PATENT DOCUMENTS

| 3,532,871 A | * | 10/1970 | Shipman ..................... 362/511 |
| 5,363,085 A | * | 11/1994 | Terada ........................ 340/425 |
| 5,365,412 A | * | 11/1994 | Koppolu et al. ............. 362/511 |
| 6,102,559 A | * | 8/2000 | Nold et al. .................. 362/511 |
| 6,128,431 A | * | 10/2000 | Siminovitch ................ 362/511 |
| 6,220,733 B1 | * | 4/2001 | Gordon ....................... 362/511 |

FOREIGN PATENT DOCUMENTS

JP 6-243703 9/1994

\* cited by examiner

Primary Examiner—Y. My Quach-Lee
Assistant Examiner—Peggy A Neils
(74) Attorney, Agent, or Firm—Foley & Lardner

(57) ABSTRACT

A vehicle lighting device has a housing, a plurality of light guides extending in radial fashion from the substantially center part of the housing, a reflector within the housing, and a plurality of LED light sources. The surface of each light guide has a reflective region with a reflecting means along the longitudinal direction thereof and an transmissive region in which the reflecting means is not provided. The transmissive region faces forward, and the reflective region faces rearward. The reflector is disposed further to the rear than the light guides, and in opposition to the reflective regions. Each LED light source is in proximity to one end of a light guide.

7 Claims, 11 Drawing Sheets

VEHICLE LIGHTING DEVICE USING LED LIGHT SOURCE

BACKGROUND OF THE INVENTION

1. Field of the Invention

The present invention relates to a lighting device for a vehicle which uses an LED light source, such as applied to a rear combination lamp of a vehicle.

2. Related Art

In a vehicle lighting device disclosed in the Japanese Unexamined Patent Application Publication H6-243703, light emission with a three-dimensional appearance is obtained, in spite of using an LED light source.

SUMMARY OF THE INVENTION

However, because the emission range of a single LED light source is narrow, it is necessary to use a large number of LED light sources for a sufficient light-emission surface area. For this reason, a vehicle lighting device using an LED light source of the past tended to be high in cost.

Accordingly, it is an object of the present invention to provide a vehicle lighting device enabling the achievement of a sufficiently large light-emitting surface area with a small number of LED light sources, and which also is capable of imparting a three-dimensional appearance to the light emitted, thereby resulting in an improvement in quality and a reduction in cost.

To achieve the above-noted objects, a vehicle lighting device according to the present invention has a housing, a plurality of light guides extending in radial fashion from substantially the center part of the housing, a reflector within the housing, and a plurality of LED light sources. The surface of each light guide has a reflective region with a reflecting means long the longitudinal direction thereof, and a transmissive region in which the reflecting means is not provided. The transmissive region faces forward, and the reflective region faces rearward. Each LED light source is in proximity to one end of a light guide.

In the above-noted configuration, the light emitted from the LED light sources, passes inside the light guides. When this happens, part thereof is reflected by the reflecting means, and another part thereof is scattered within the light guide and exits from the transmissive region. The result of this is that the transmissive region of the light guide emits light of the color of light that is emitted from the LED light source, the reflector emitting light of the same color as the light guide, by reflection of light emitted rearward of the light emitted because of the scattered reflected light.

For this reason, when the LED light source is extinguished, the lighting device appears white overall and, when the LED light source is lighted, the combination of the light emitted from the light guide itself and the light emitted from the reflector is the same color overall as the light emitted from the LED light source. Under this condition, because of the distance separating the light guide and the reflector, a three-dimensional appearance is imparted to the light emitted.

Because it is possible to achieve a light-emission surface area by means of the light guided by the light guide and the light reflected by the reflector, it is possible to establish a sufficiently broad light-emitting surface area with a small number of LED light sources, and also possible to impart a three-dimensional appearance to the light emitted. As a result, a vehicle lighting device is provided that enables both an improvement in quality and a reduction in cost.

The light guides can have a fan shape that broadens towards the distal end with respect to the center, and the distal end of each light guide can be in proximity to a plurality of LED light sources.

In the above-noted configuration, light-emitting surface area and amount of light per light guide become large, thereby improving the overall intensity. because the width of the light guide increases toward the distal end with respect to the center, even at the outermost position on the housing at which the spacing distance between light guides is maximum, sufficient light-emitting surface area and amount of emitted light are achieved, and a three-dimensional appearance is imparted to the light emitted at this location.

A proximal end of a first light guide can be disposed further rearward than the proximal end of a second light guide.

In the above-noted configuration, proximal ends of light guides are efficiently disposed at substantially the center part of the housing, the number of light guides that can be disposed thereat not being restricted by the size of the substantially center part of the housing. For this reason, it is possible to increase the number of light guides that are provided, so as to increase the light-emitting surface area and amount of emitted light, which in turn enables an improvement in the overall light intensity. Additionally, it is possible to fabricate the light guides so that they largely overlap to the front and rear of the housing, thereby enabling the imparting of a further three-dimensional appearance to the light emitted. It is possible to have light guides overlap one another front to back at the substantially center part of the housing, it is possible to impart a further three-dimensional appearance to the emitted light, thereby enabling an improvement in quality.

The light guides can include a plurality of first and second light guides alternately disposed, and the first light guides can be disposed further rearward than the second light guides. A reflecting means disposed on one of the first light guides can have a width that provides a light-emission range corresponding to the mutual distance between two second light guides adjacent to the one first light guide.

In the above-noted configuration, emitted light of an LED light source that is guided by a first light guide and reflected by a reflecting means is emitted over a narrow range, without striking a second light guide and forming a shadow, there being an accompanying increase in the amount of light emitted by the LED light source in the reflection direction, thereby improving the efficiency of light usage.

The light guide can be a solid element with a substantially rectangular cross-section.

In the above-noted configuration, because a strong directivity is imparted to light emitted from light of the LED light source exiting the light guide, there is an improvement in visibility.

BRIEF DESCRIPTIONS OF THE DRAWING

DESCRIPTION OF THE PREFERRED EMBODIMENTS

Figure 1A:
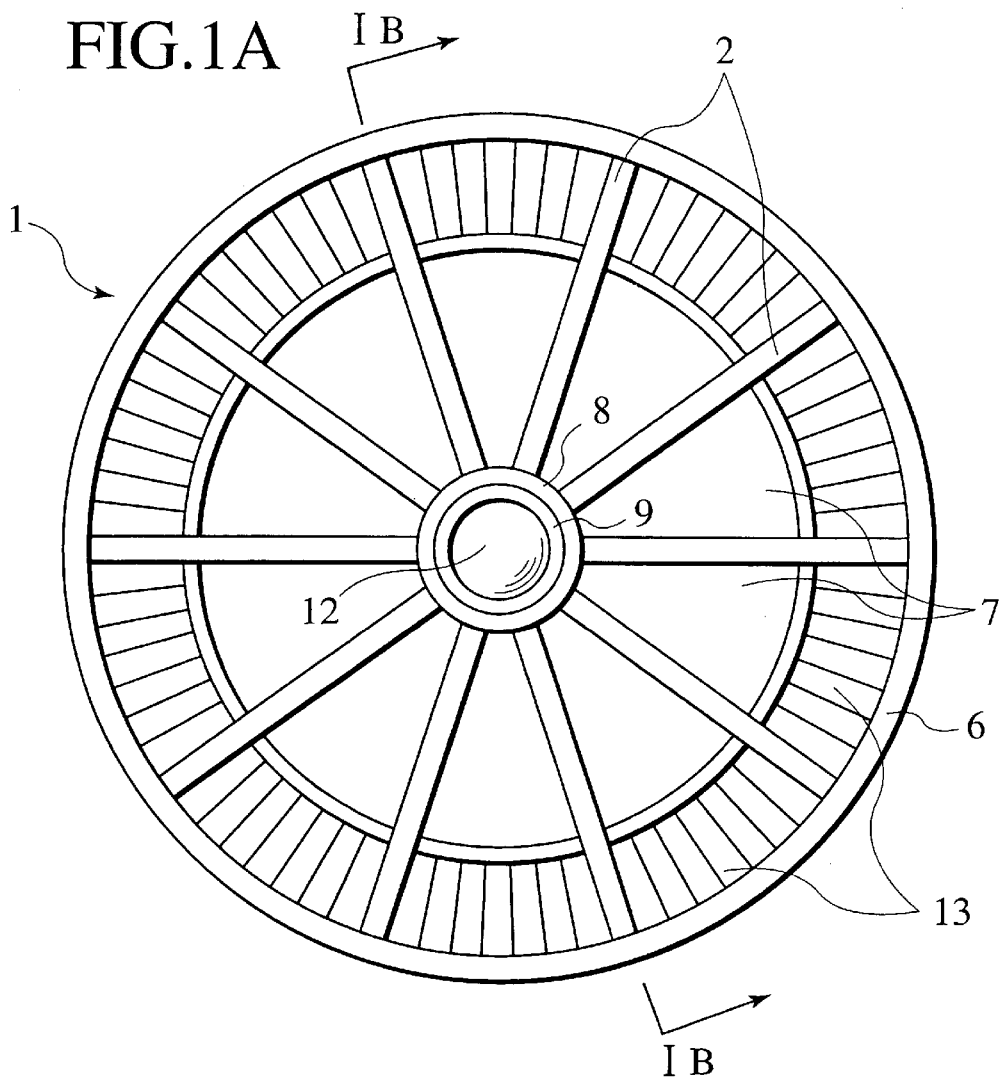
FIG. 1A is a plan view of a vehicle lighting device according to a first embodiment of the present invention.
Figure 1B:
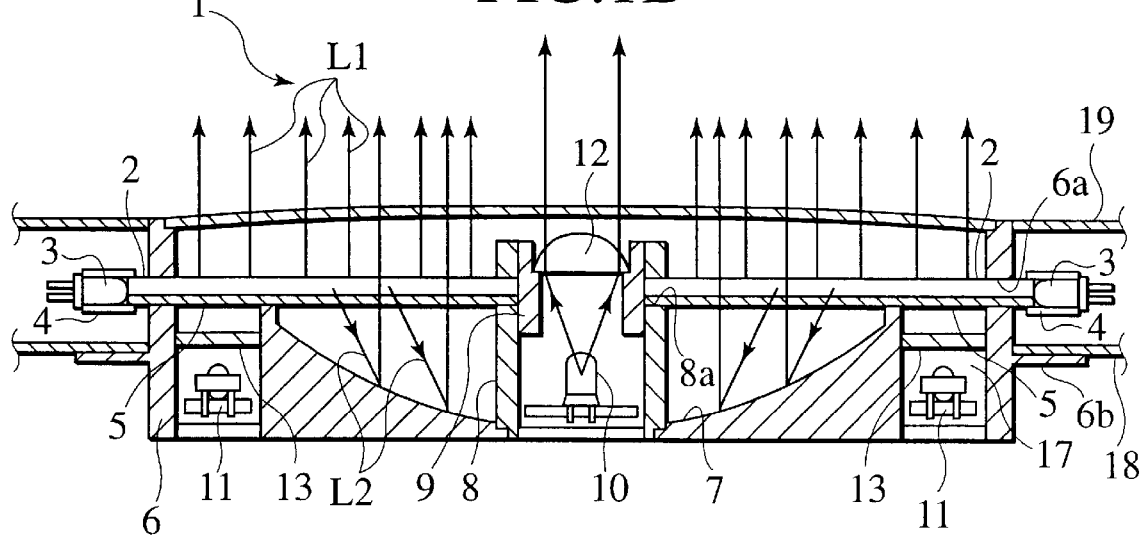
FIG. 1B is a cross-sectional view of the lighting device of FIG. 1A, viewed in the direction of the line IB—IB.
Figure 2:
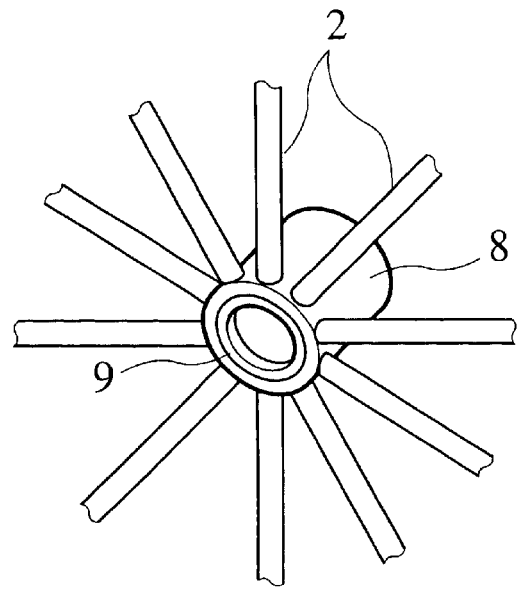
FIG. 2 is an perspective view of the main part of the vehicle lighting device of FIG. 1A.

Embodiments of the present invention are describe in detail below, using the example of a rear combination lamp, and making reference to relevant accompanying drawings.

FIG. 1a through FIG. 3B show a vehicle lighting device 1 according to a first embodiment of the present invention. The lighting device 1 has a plurality of light guides 2, a plurality of LED light sources 3, a reflecting means 5, a housing 6, and a reflector 7. Each of the light guides 2 has a reflecting means 5 on part of a surface thereof, in the longitudinal direction. Each LED light source 3 is disposed in proximity to a distal end of a light guide 2. The reflecting means 5 is disposed at the rear side of the housing 6, and faces rearward. The light guides 2 are disposed in a radial manner, with the origins thereof at the substantially center part of the housing 6. The reflector 7 is disposed in opposition to a plurality of light guides 2 to the rear side thereof within the housing 6, so as to reflect light emitted by the LED light sources 3 and exiting the The light guide 2 is formed as, for example, long solid optical fiber having a circular cross-section. The LED light source 3 is installed into a socket 4 provided at one end of the light guide 2, in opposition to the distal end face of the light guide so that light is not leaked therefrom. The reflecting means (indicated by hatching in FIG. 1B and FIG. 3A) by application of reflective paint or partial belt-shaped chroming of the surface of the light guide in the longitudinal direction. In this embodiment, this is achieved by reflective paint.

The housing 6 has a supporting tube 8 at the center part thereof, a bowl-shaped reflector 7 being provided so as to surround the supporting tube 8, and a peripheral groove 17 is provided around the outer periphery of the reflector 7, the overall shape being circular.

The light guides 2 are mounted toward the front of the reflector 7, and in opposition to the reflecting means 5. The distal ends of the light guides 2 pass through mounting holes 6a formed in the outer peripheral wall of the housing 6, and the LED light sources 3 are positioned outside the housing 6. The proximal ends of the light guides 2 pass through mounting holes 8a formed in the supporting tube 8 and are mounted thereat. The faces of the proximal ends of the light guides 2 are covered by an inner tube 9 that is fitted as into the supporting tube 8, so as to mount the light guides 2 so that light does not leak from the end faces thereof. In this embodiment, 10 light guides 2 are mounted at a uniform spacing around the periphery of the housing 6.

A flange 6b on the outer periphery of the housing 6 is fixed to vehicle body bracket 18, and in this condition LED light sources 3 protruding from the outer periphery of the housing 6 are covered by the vehicle body panel 19.

A central LED light source 10 is mounted at the bottom of the supporting tube 8. The inner tube 9 that supports the light guides 2 is fitted into the supporting tube 8, a convex center inner lens 12 being fitted into the inner tube 9. Peripheral LED light sources 11 are mounted at the bottom of the peripheral groove 17, so as to correspond to the substantially center part between the light guides 2. The front of the peripheral LED light sources 11 are covered by convex peripheral inner lenses 13. A front aperture of the housing 6 is covered by an outer lens 15. In this configuration, for example, red LED elements are used for the LED light sources 3, the center LED light source 10, and the peripheral LED light sources 11. The peripheral inner lenses 13 are configured as multilayer lenses, formed by a first lens, which is a cylindrical lens positioned to the front, and a second lens, which is a Fresnel lens positions to the rear.

In a lighting device 1 configured as described above, when the LED light sources 3, 10, and 11 are extinguished, the overall lighting device appears white, and when the LED light sources 3 and the central LED light source 10 are lighted, the overall lighting device appears to light red, so as to function as a tail lamp. When the LED light sources 3, the central LED light source 3, and the peripheral LED light sources 11 are lighted, the belt-shaped part at the outer periphery lights red with an intensity that is greater than the center part, thereby functioning as a brake lamp.

Figure 3A:
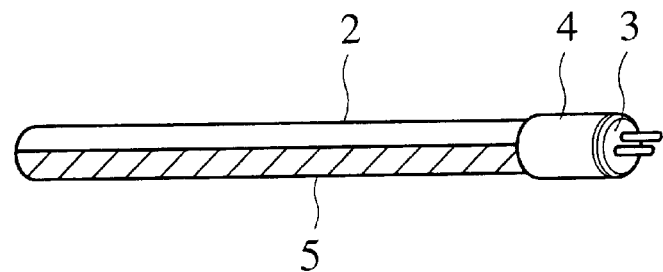
FIG. 3A is a side elevation of a light guide applied to the vehicle lighting device of FIG. 1A.
Figure 3B:
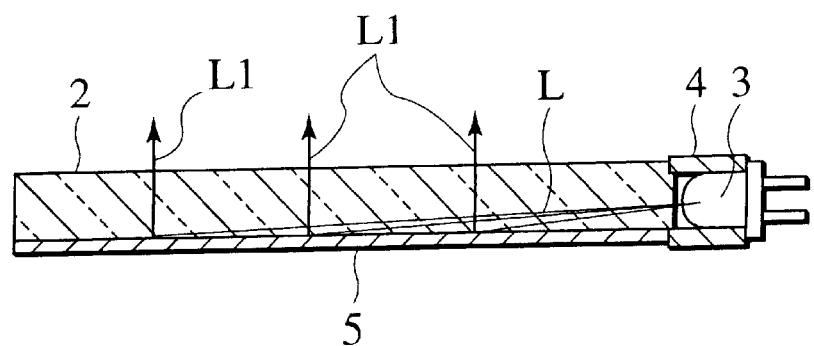
FIG. 3B is a vertical cross-sectional view of the light guide of FIG. 3A.

When the above occurs, the light L emitted from a LED light source 3, as shown in FIG. 3B, is guided within a light guide 2, during which light guiding process part of the light is reflected by the reflecting means 5, and another part of the light is scattered and reflected within the light. guide 2, and exits from a part other than the part at which the reflecting means 2 of the light guide 2 is formed. By doing this, a part of the light guide 2 other than the part at which the reflecting means 5 is formed emits light of the color of the emitted from the LED light source 3, and the reflector 7, by reflection of the part of the scattered reflected light that is emitted toward the rear surface side, emits a light that is the same color as the light guide 2.

For this reason, although when the LED light sources 3 are extinguished, the overall lighting device appears white, when the LED light sources 3 are lighted, the emitted light of the light guides 2 themselves and the emitted light of the reflector 7 combine, so that the overall lighting device emits light of the color of the light L emitted from the LED light sources 3. Under this condition, because of the distance separating the light guides 2 and the reflector 7, a three-dimensional appearance is imparted to the light emitted therefrom.

According to a lighting device 1 as described above, because it is possible to achieve light-emitting surface area by the reflector 7, it is possible to establish a sufficiently large light-emitting surface area with a small number of LED light sources 3, and further possible to impart a three-dimensional appearance to the emitted light, thereby enabling not only an improvement in quality but also a reduction in cost.

FIG. 4A through FIG. 6 show a lighting device according to a second embodiment of the present invention. In this lighting device 20, the only difference with respect to the above-noted first embodiment is that the light guides 14 have a width that gradually increase in a fan-shape toward the distal ends thereof from the center, and that there are a plurality of LED light sources 3 at the distal ends of the light guides 14, other elements being the same as the lighting device 1. For this reason, constituent elements that are the same as the lighting device 1 are assigned the same reference numerals, and are not explicitly described herein. In FIG. 4B and the later-described FIG. 7B and FIG. 9B, the flange 6b, the vehicle body bracket 18, and the vehicle body panel 19 of FIG. 1B have been omitted.

Figure 5:
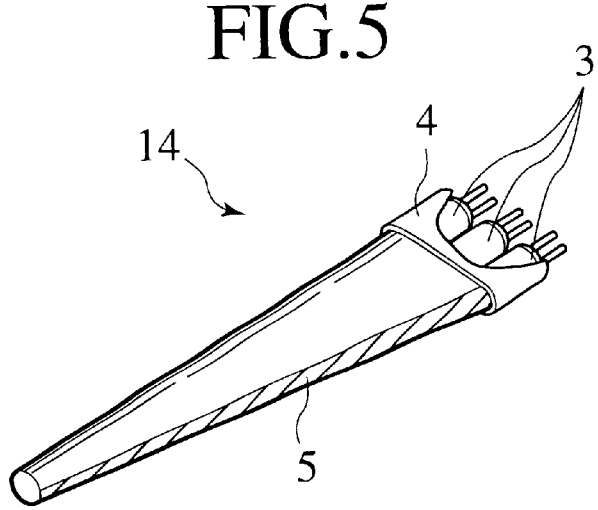
FIG. 5 is a partially cut-away perspective view of a light guide applied to the vehicle lighting device of FIG. 4A.
Figure 6:
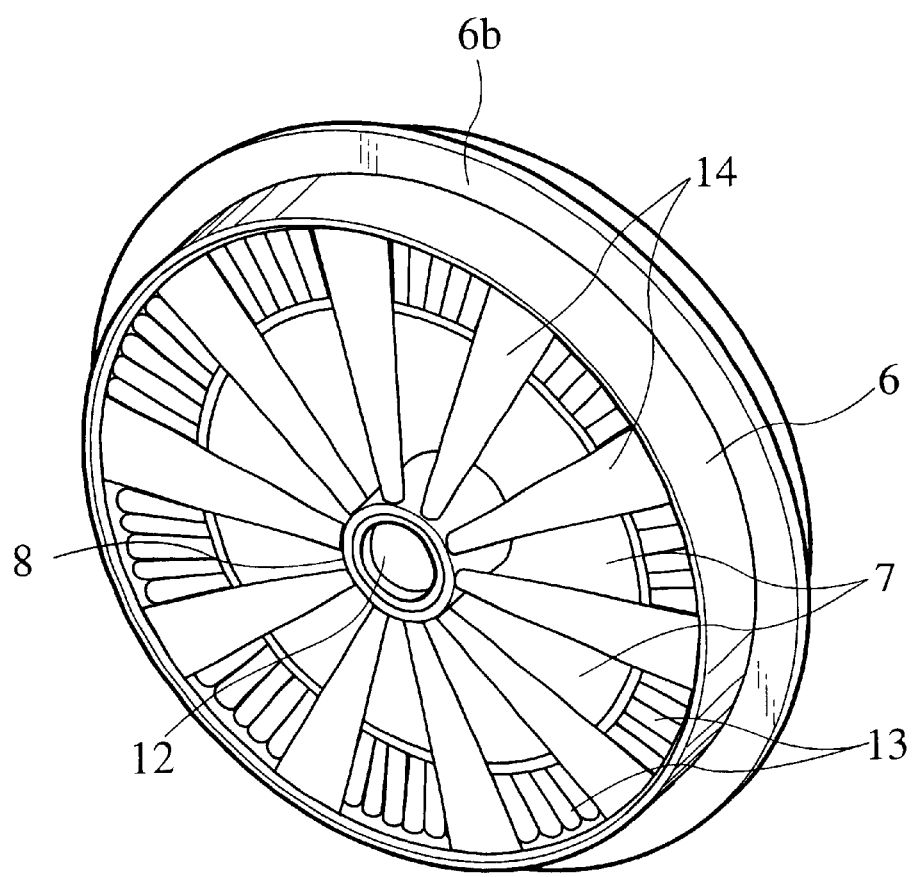
FIG. 6 is an overall perspective view of the vehicle lighting device of FIG. 4A.

Specifically, as shown in FIG. 5, one end of the light guides 14 has an elongated circular cross-section, and the other end has a circular cross-section, the light guide forming a long solid optical fiber, with a reflecting means 5 applied to part thereof along the longitudinal direction of a surface that includes the broad surface on one side. The LED light sources 3 is attached to a wide socket 4 provided on one end of the light guide 14, with three LED light sources mounted to the elongated circular end face so that there is no leakage of light therefrom.

Figure 4A:
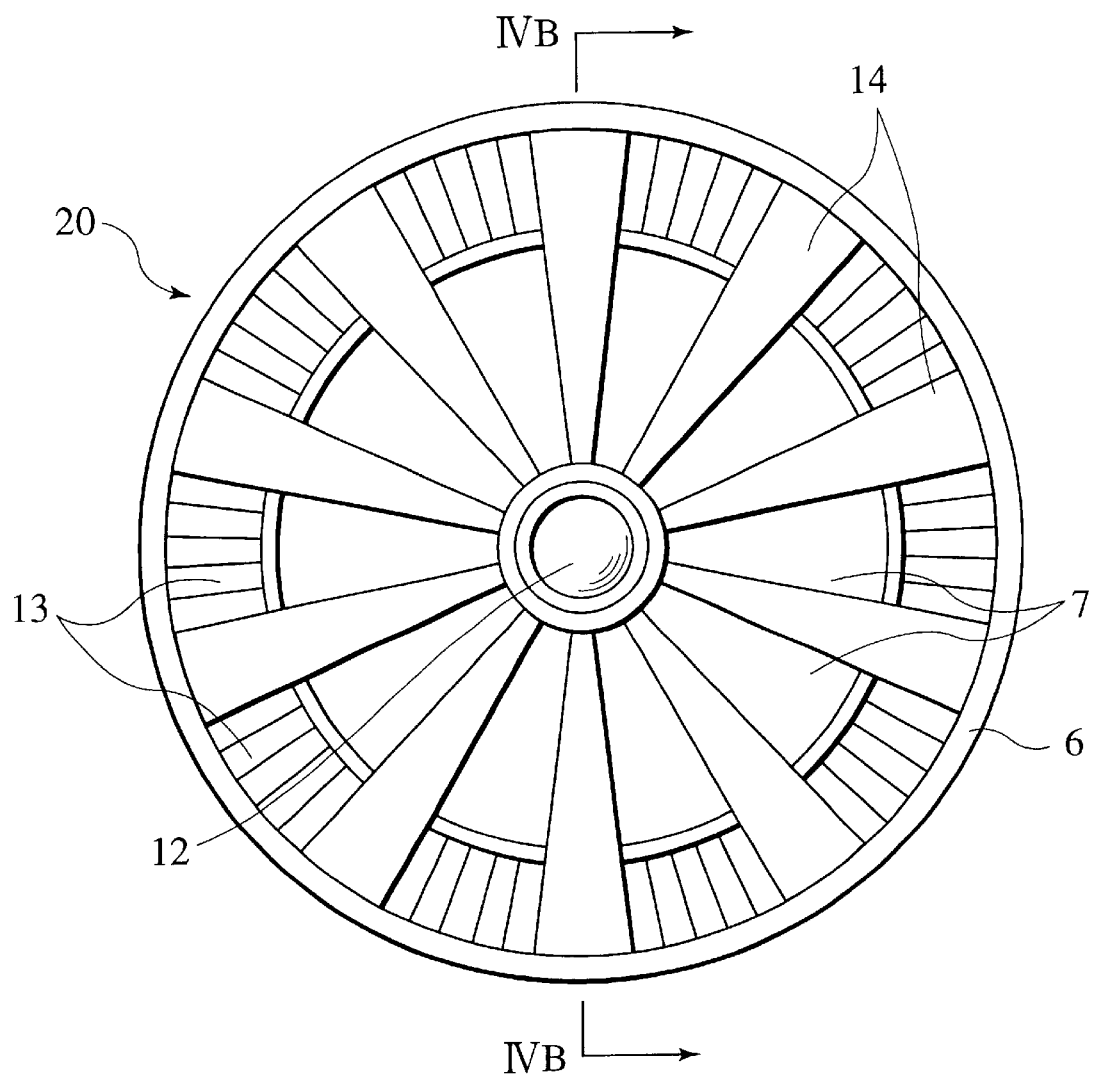
FIG. 4A is a plan view of a vehicle lighting device according to a second embodiment of the present invention.
Figure 4B:
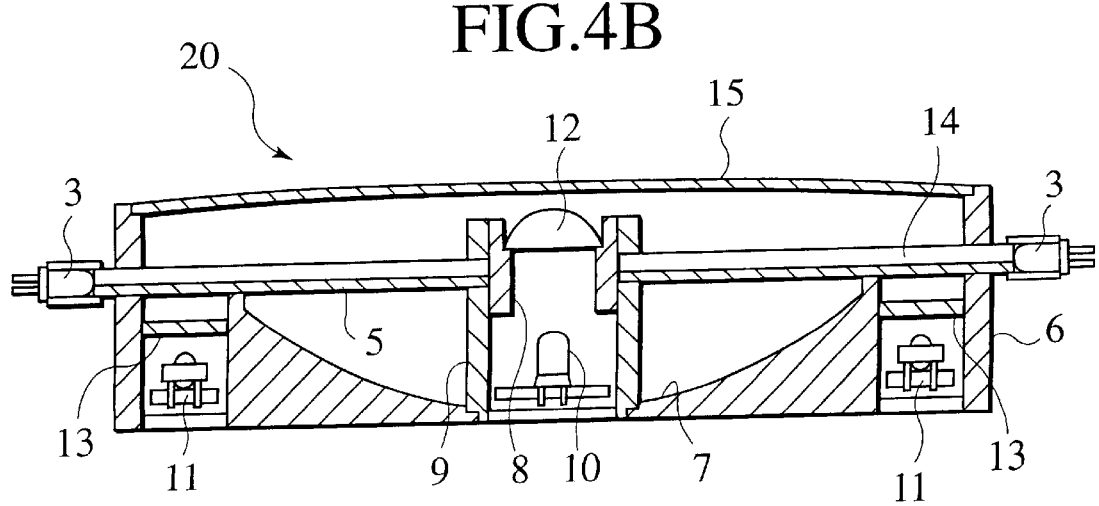
FIG. 4B is a cross-sectional view of the lighting device of FIG. 4A, viewed in the direction of the line IVB—IVB.

As shown in FIG. 4A and FIG. 4B, the distal ends of the light guides 14 are supported at the peripheral wall of the housing 5, and the proximal ends of the light guides 4 are supported by the supporting tube 8. The reflecting means 5 opposes the reflector 7 and is mounted to the housing 6.

According to the lighting device 20, the light-emitting surface area and amount of emitted light per light guide 14 is large, thereby enabling an improvement in the overall light intensity. Because the light guides 14 have a width that increases towards the distal ends thereof, even at the inner periphery of the outermost side of the housing, at which the distance between light guides is maximum, it is possible to achieve sufficient light-emitting surface area and amount of emitted light, thereby imparting a three-dimensional appearance to the light emitted at this location.

FIG. 7A through FIG. 9B show lighting devices 21 and 22 according to a third embodiment of the present invention. The lighting devices 21 and 22 differ from the lighting device 1 of the first embodiment only in that the end parts of the plurality of light guides 2 at the substantially center part of the housing 6 are shifted between one another to the front and rear, with other aspects of the configuration being the same as in the lighting device 1. For this reason, constituent elements that are the same as in the lighting device 1 are assigned the same reference numerals and are not explicitly described herein.

Figure 7A:
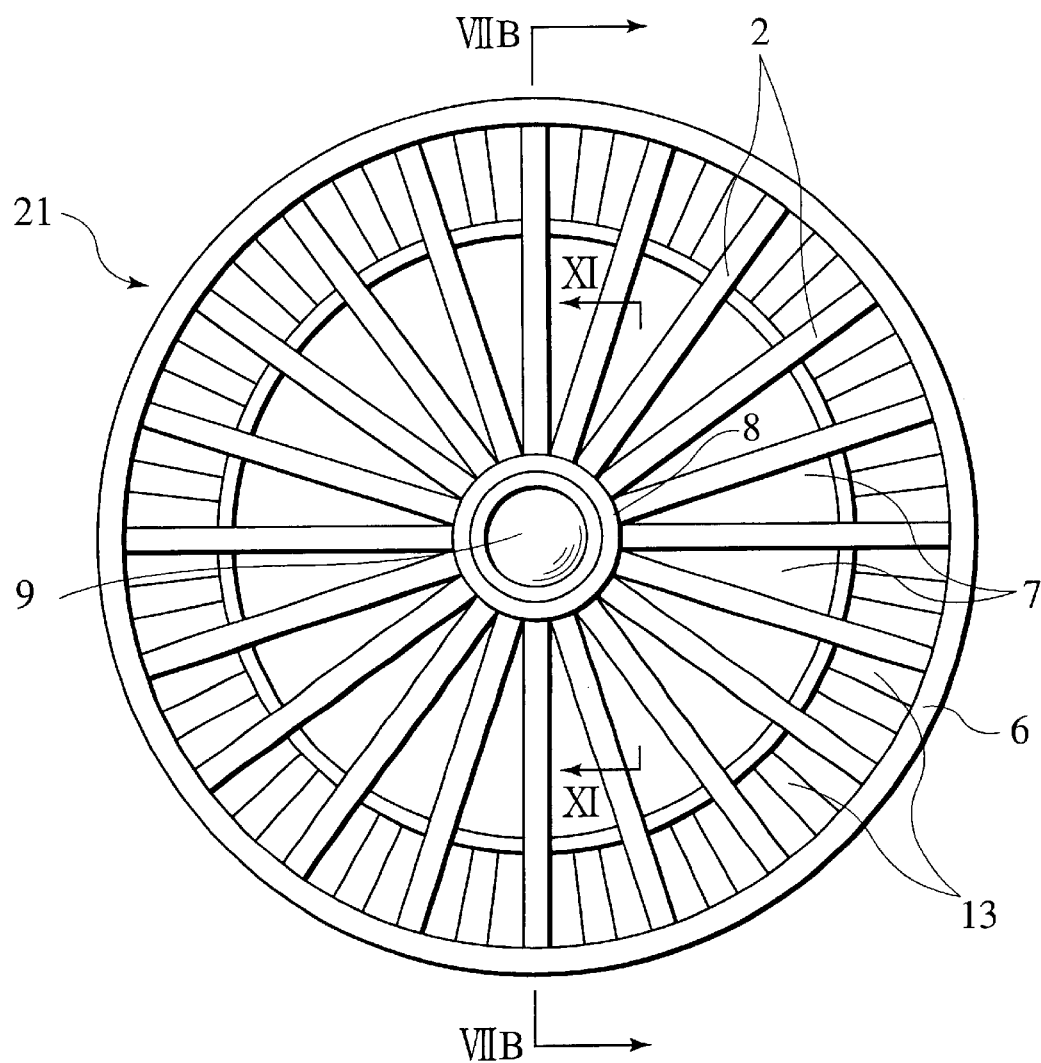
FIG. 7A is a plan view of a vehicle lighting device according to a third embodiment of the present invention.
Figure 7B:
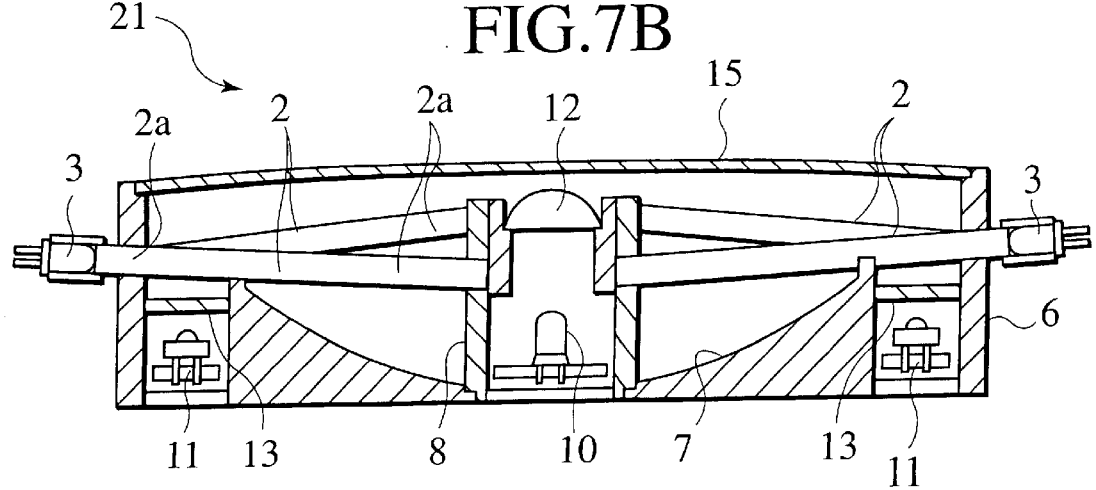
FIG. 7B is a cross-sectional view of the lighting device of FIG. 7A, viewed in the direction of the line VIIB—VIIB.
Figure 8:
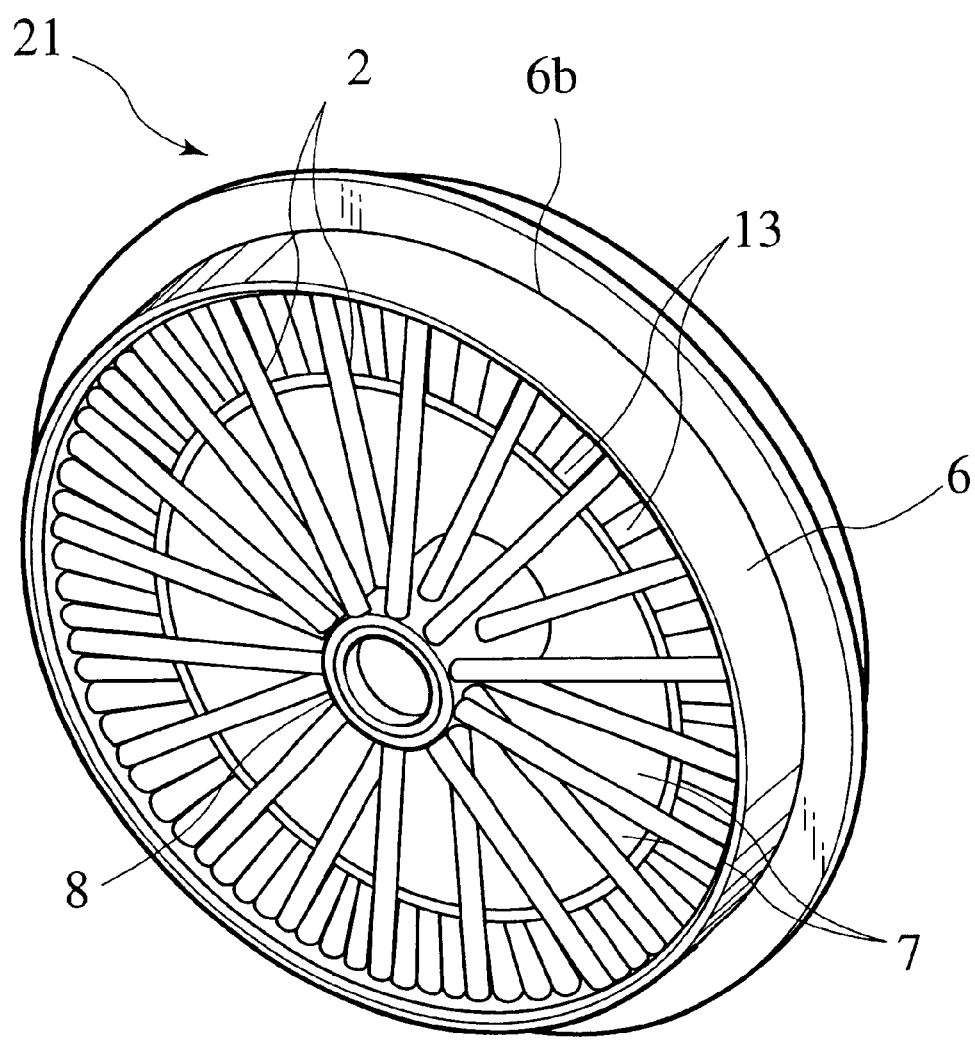
FIG. 8 is an overall perspective view of the vehicle lighting device of FIG. 7A.

Specifically, in the lighting device 21, as shown in FIG. 7A, FIG. 7B, and FIG. 8, the light guides 2 are positioned and mounted to the housing 6 such that the ends 2b of the plurality of light guides 2 are supported at the same height at the outer peripheral wall of the housing 6, while the other ends 2a at the substantially center part of the housing 6 are supported by the supporting tube 8 so that the ends 2a are alternately shifted toward the front and rear of the housing 6, and also so that the reflecting means 5 (not shown in the drawing) are positioned on the reflector 7 side. For this reason, the plurality of light guides 2 when seen from the side, appear to be alternately inclined, as shown in FIG. 7B.

Figure 9A:
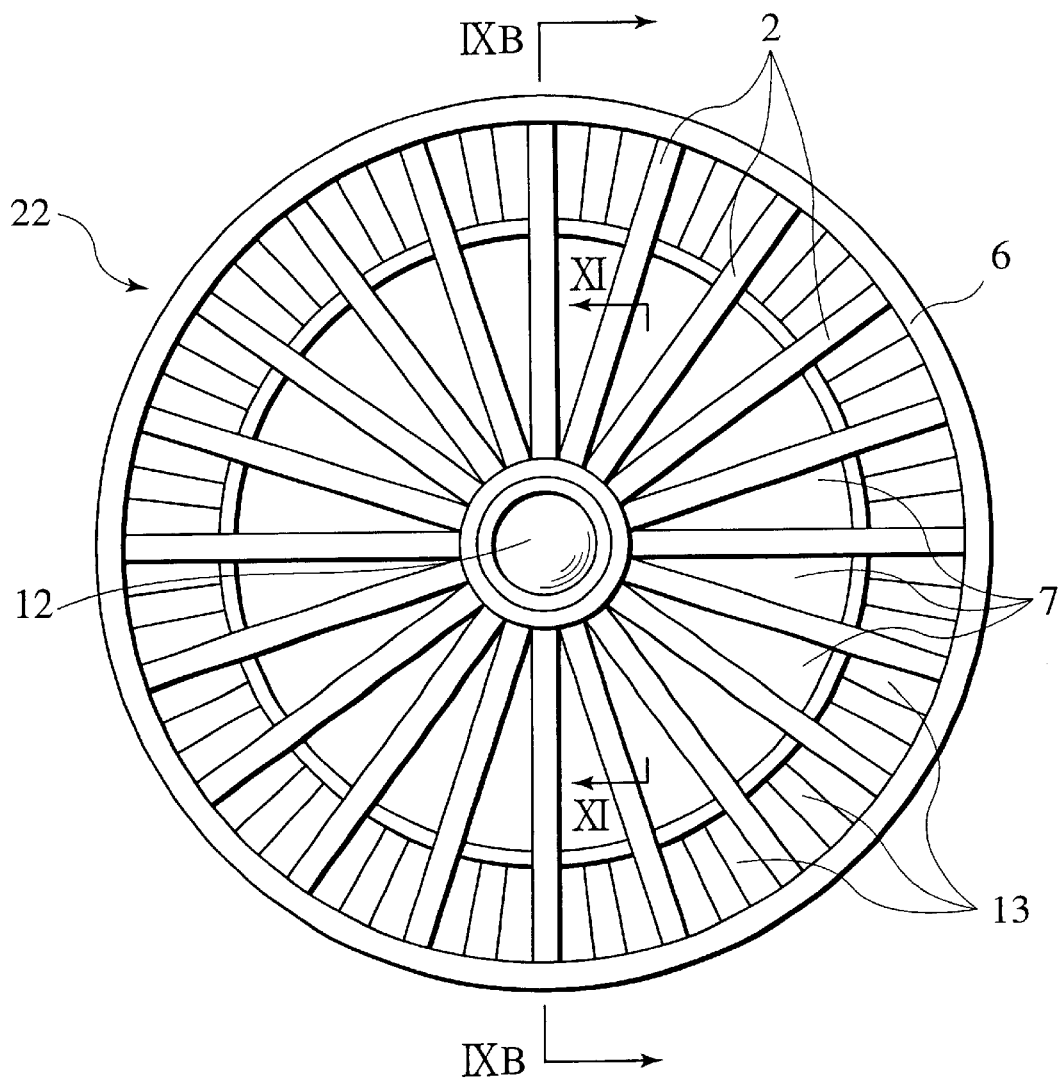
FIG. 9A is a plan view of another lighting device according to the third embodiment of the present invention.
Figure 9B:
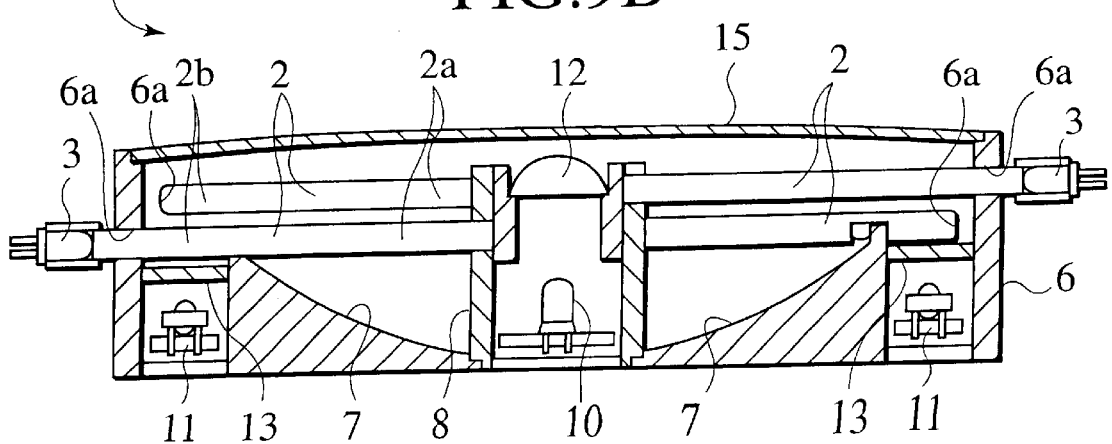
FIG. 9B is a cross-sectional view of the lighting device of FIG. 9A, viewed in the direction of the line IXB—IXB.

In the lighting device 22, as shown in FIG. 9A and FIG. 9B, the plurality of light guides 2 are positioned and mounted to the housing 6 so that both ends 2a and 2b thereof are positioned at the supporting tube 8 and at the peripheral wall of the housing 6 so that they alternate to the front and rear of the housing, the supported parts at the supporting tube 8 and the peripheral wall of the housing 6 being at the same heights, and so that the reflecting means 5 (not shown in the drawing) are positioned on the reflector 7 side. For this reason, the plurality of light guides 2, when seen from the side appear as if they are mutually parallel, as shown in FIG. 9B.

According to the lighting devices 21 and 22, it is possible to provide a number of light guides 2, without a limitation imposed by the peripheral length of the supporting tube 8 that supports the ends 2a at the substantially center part of the housing 6, so that there is an accompanying increase in the number of light guides 2, enabling an increase in the light-emitting surface area and amount of emitted light, thereby enabling an improvement in the overall light intensity. In this embodiment, 20 light guides 2, double the number in the lighting device 1, are mounted to the lighting devices 21 and 22.

In addition, it is possible to arrange the light guides 2 so that they largely overlap front and back in the housing 6, thereby imparting a further three-dimensional appearance to the emitted light.

Figure 10A:
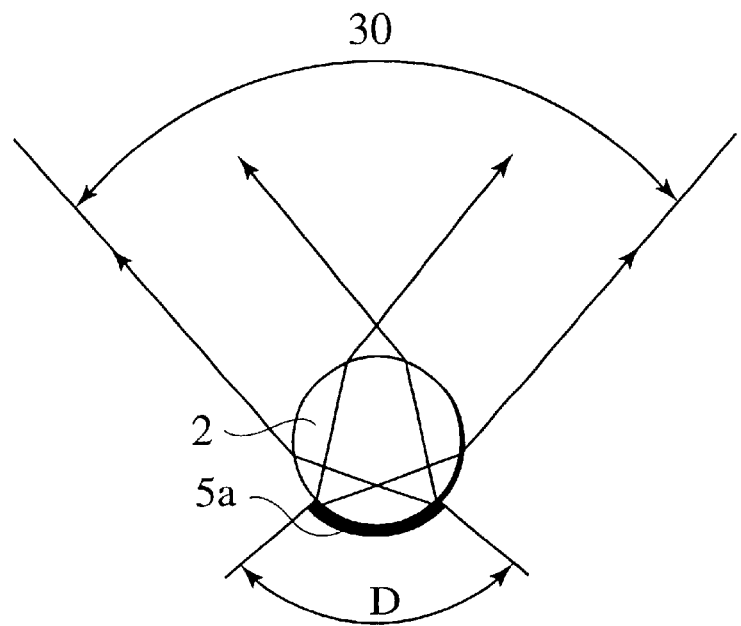
FIG. 10A is a drawing illustrating the action of a light guide to which has been applied a wide reflecting means.
Figure 10B:
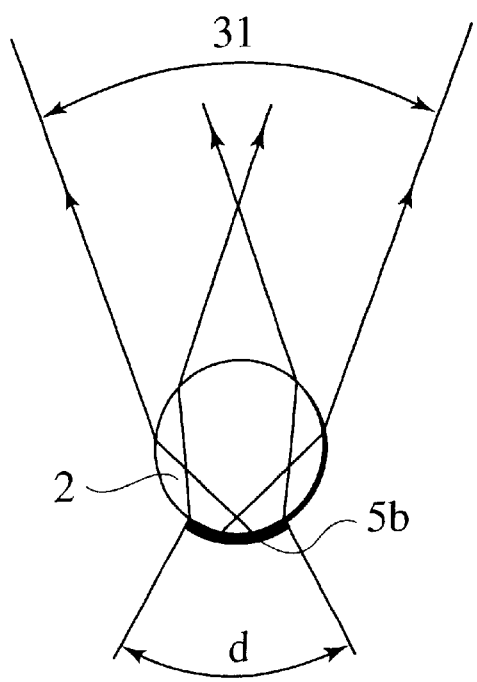
FIG. 10B is a drawing illustrating the action of a light guide to which has been applied a narrow reflecting means.

The light-emission characteristics of the light guide 2 can be established by the width or narrowness with which the reflecting means 5 is formed. That is, as shown in FIG. 10A, in the case of a reflecting means 5 with a wide width D, the light emanating from the light guide 2 covers a wide range 30, while in the case shown in FIG. 10B, with a reflecting means 5b having a narrow width d, the light emanating from the light guide covers only a narrow range 31.

For this reason, it is preferable in the lighting devices 21 and 22 that the reflecting means 5 applied to the plurality of light guides 2 positioned to the rear of the housing 6 have a light-emission range that corresponds to the mutual distance separating a plurality of light guides 2 positioned to the front side of the housing 6.

Figure 11A:
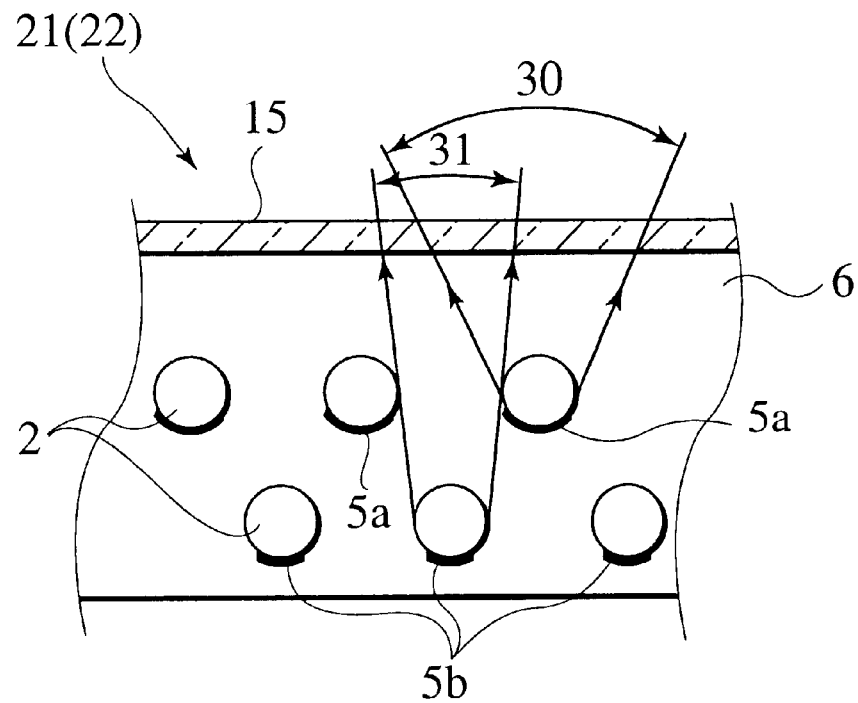
FIG. 11A is a partial cross-sectional view along the lines XI—XI in FIG. 7A and FIG. 9A, showing a variation on the vehicle lighting device according to the third embodiment of the present invention.

More specifically, in the lighting devices 21 and 22, as shown in FIG. 11A, a reflecting means 5a having a wide light-emanating range 30 is provided on a plurality of light guides 2 positioned to the front side of the housing 6, and a reflecting means 5b having a narrow light-emanating range 31 is provided on a plurality of light guides 2 positioned to the rear side of the housing 6.

According lighting devices 21 and 22 configured as described above, light emanating from an LED light source 2 positioned at the rear of the housing 6 does not cause a shadow of a light guide 2 positioned to the front side of the housing, and is emitted over a narrow range 31 corresponding to the mutual distance separating the light guides 2 at the front side of the housing, thereby enabling an increase in the amount of light emanating from the LED light source 3 from the reflector 7, and enabling an increase in the efficiency of light usage.

Figure 11B:
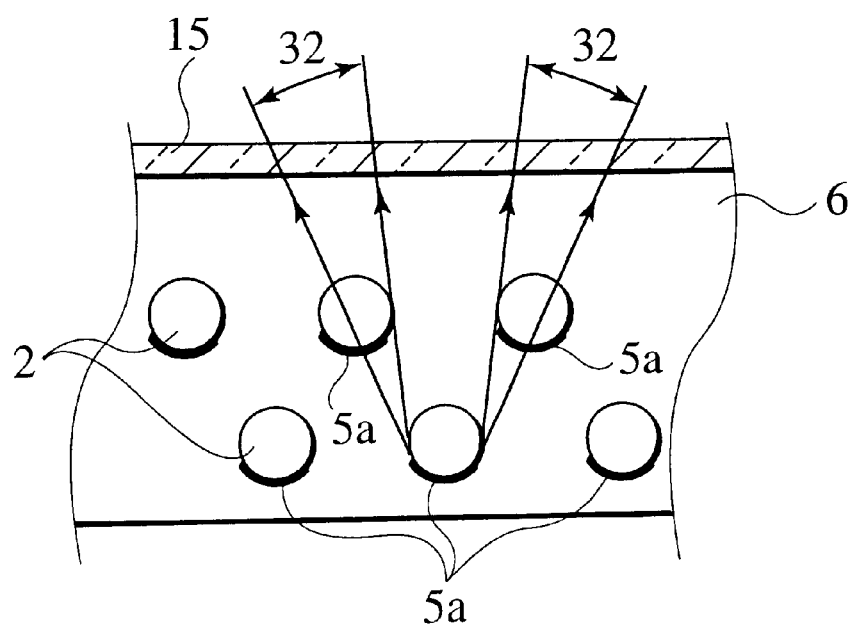
FIG. 11B is a cross-sectional view of the main part of a comparison example.

In contrast to this, as shown in FIG. 11B, in the case in which a wide reflecting means 5a with a wide light-emanating range is provided at all the light guides 2 position at both the front and rear sides of the housing 6, the light emitted from an LED light source 3 from a light guide 2 positioned at the rear side of the housing 6 forms a shadow of light guides positioned toward the front of the housing in the part 32 of the light-emanating range on both sides, and because the amount of light emanating from the LED light source 3 in the direction of the reflector 7 is small, the efficiency of light usage is decreased.

Figure 12:
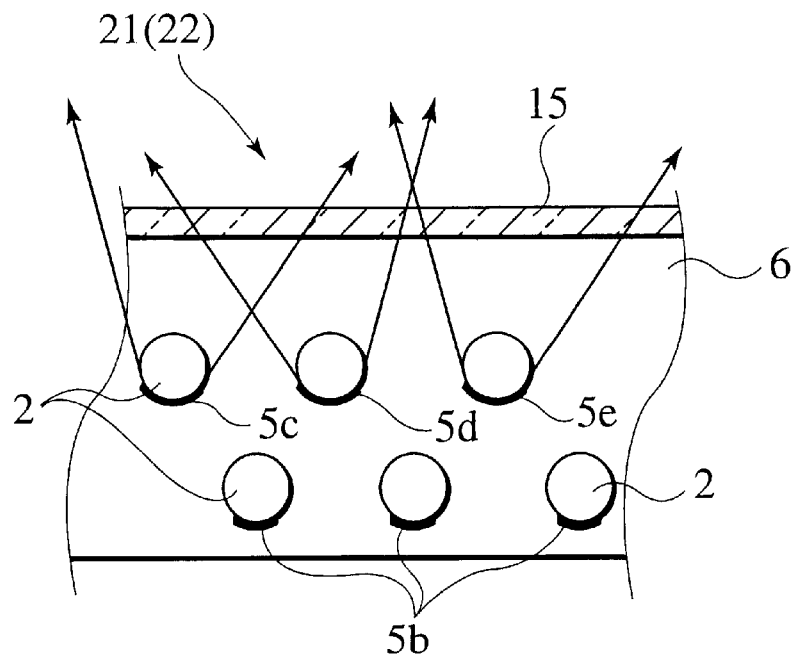
FIG. 12 is a partial cross-sectional view along the lines XI—XI in FIG. 7A and FIG. 9A, showing another variation on the vehicle lighting device according to the third embodiment of the present invention.
Figure 13:
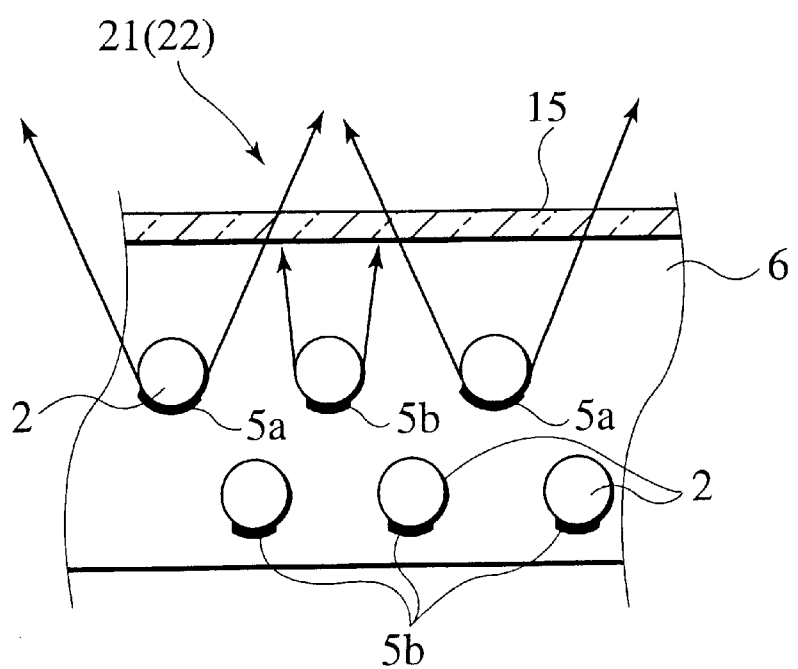
FIG. 13 is a partial cross-sectional view along the lines XI—XI in FIG. 7A and FIG. 9A, showing yet another variation on the vehicle lighting device according to the third embodiment of the present invention.

Additionally, variations of the lighting devices 21 and 22 such as shown in FIG. 12 and FIG. 13 can be envisioned.

In the lighting devices 21 and 22 shown in FIG. 12, the reflecting means provided in a light guide 2 positioned toward the front side of the housing 6 are wide reflecting means 5c, 5d, 5e, and so one, with different directions for each light guide 2, and a narrow reflecting means 5b is provided for each of the light guides 2 positioned to the rear side of the housing 6. In this variation, it is possible to obtain a light distribution with different emission directions (major light axes) at each of the light guides 2 at the front side, the combination of these light distributions having different light emission directions enabling the imparting of an overall characteristic appearance to the lighting device, thereby enabling the establishment of a degree freedom in design thereof.

In the lighting devices 21 and 22 shown in FIG. 13, the configuration is one in which the plurality of light guides 2 positioned at the front side of the housing is a combination of light guides 2 with a wide reflecting means 5a and light guides 2 with a narrow reflecting means 5b, and in which all the light guides positioned at the rear side of the housing 6 are provided with a narrow reflecting means 5b.

Figure 14:
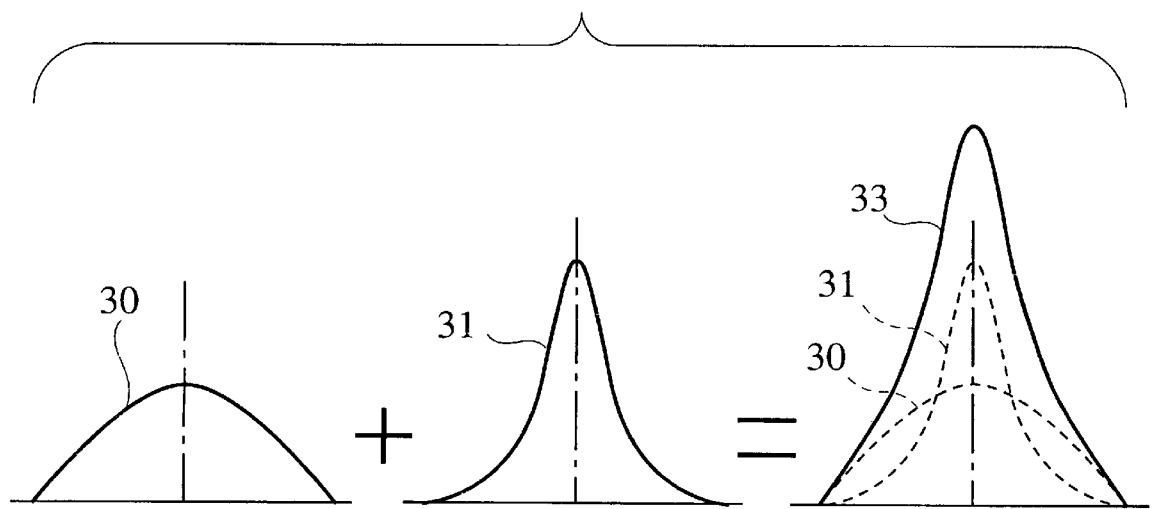
FIG. 14 is a drawing illustrating the light emission pattern of the lighting device of FIG. 13.

In this variation example, depending upon whether the reflecting means provided on each of the light guides 2 is the wide reflecting means 5a or the narrow reflecting means 5b, light distributions with differing light-emission characteristics (FIG. 10) are obtained, the combination of these light distributions with different light-emission characteristics enabling the achievement of a characteristic overall appearance of the lighting device, thereby enabling a broadening of the degree of freedom in the design thereof. FIG. 14 shows one example of this, in which the combination of a light-emanating pattern A of a light guide 2 provided with a wide reflecting means 5a and a light-emanating pattern a of a light guide provided with a narrow reflecting means 5b enables the achievement of a light-emanating pattern 33 from the overall lighting device.

Additionally, if the light-emission direction shown in FIG. 12 is changed, by using the combination of light-emission characteristics shown in FIG. 13, it is possible to achieve an even further degree of freedom in design.

Figure 15:
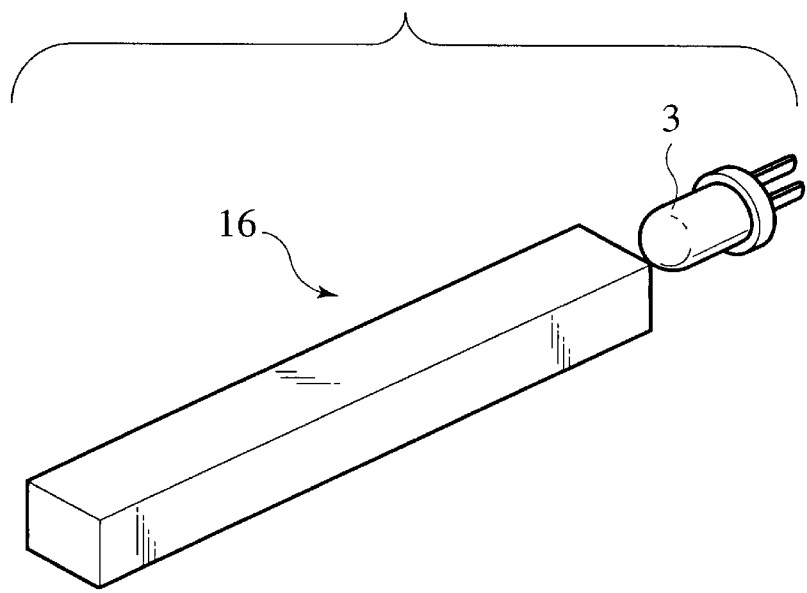
FIG. 15 is a perspective view of another light guide applied to a lighting device according to the present invention.

FIG. 15 shows another light guide 16, which is configured as a solid element having a rectangular cross-section. More specifically, the light guide 16 is a long, solid optical fiber having a rectangular cross-section. In this light guide 16, a reflecting means 5 is provided on one side face of the four sides making up the rectangular cross-section.

Because in a lighting device with the light guide 16 it is possible to impart a strong directivity to the light emitted from an LED light source 3 exiting the light guide 16, it is possible to improve visibility.

What is claimed is:

1. A vehicle lighting device, comprising:

a housing;

a plurality of light guides extending in radial fashion from substantially a center part of the housing, each light guide extending along a respective longitudinal direction, a surface of each of which has a reflective region with a reflecting means along its respective longitudinal direction, and a transmissive region in which the reflecting means is not provided, the transmissive region facing in a forward direction and the reflective region facing in a rearward direction opposite to the forward direction;

a reflector within the housing, disposed to the rear of the light guides and in opposition to the reflective regions; and a plurality of LED light sources, one end of each LED light source in proximity to a respective light guide of the plurality of light guides;

wherein the light guides include a plurality of first and second light guides disposed alternately, and each of the first light guides is mutually adjacent to a respective second light guide, and wherein the reflecting means provided on one of the first light guides has a width providing a light-emission range corresponding to the mutual distance between two second light guides adjacent to the one first light guide.

2. The vehicle lighting device according to claim 1, wherein the light guides are substantially fan-shaped, having a width that increases toward a distal end of each of the light guides away from the center part of the housing.

3. The vehicle lighting device according to claim 2, wherein a plurality of LED light sources are in proximity to the distal end of each of the light guides.

4. The vehicle lighting device according to claim 1, wherein a proximal end of each of the first light guides is disposed further to the rear than a proximal end of each of the second light guides.

5. The vehicle lighting device according to claim 1, wherein a distal end of each of the first light guides is disposed further to the rear than a distal end of each of the second light guides.

6. The vehicle lighting device according to claim 1, wherein each of the light guides is a solid element with a substantially circular cross-section.

7. The vehicle lighting device according to claim 1, wherein each of the light guides is a solid element with a substantially rectangular cross-section.

* * * * *